United States Patent
Salla et al.

(10) Patent No.: US 10,280,122 B2
(45) Date of Patent: May 7, 2019

(54) TREATMENT OF SUBTERRANEAN FORMATIONS WITH SELF-HEALING RESINS

(71) Applicant: Halliburton Energy Services, Inc., Houston, TX (US)

(72) Inventors: Rajender Salla, Pune (IN); Mallikarjuna Shroff Rama, Pune (IN); Jag Pravesh, Pune (IN)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/509,184

(22) PCT Filed: Oct. 7, 2014

(86) PCT No.: PCT/US2014/059505
§ 371 (c)(1),
(2) Date: Mar. 6, 2017

(87) PCT Pub. No.: WO2016/057027
PCT Pub. Date: Apr. 14, 2016

(65) Prior Publication Data
US 2017/0247296 A1    Aug. 31, 2017

(51) Int. Cl.
*E21B 33/13*    (2006.01)
*C04B 40/06*    (2006.01)
(Continued)

(52) U.S. Cl.
CPC ...... *C04B 40/0675* (2013.01); *C04B 20/1029* (2013.01); *C04B 26/02* (2013.01);
(Continued)

(58) Field of Classification Search
None
See application file for complete search history.

(56) References Cited

U.S. PATENT DOCUMENTS

| 6,794,472 B2 | 9/2004 | Harris et al. |
| 8,047,282 B2* | 11/2011 | Lewis ............... C09K 8/467 |
| | | 166/177.1 |

(Continued)

FOREIGN PATENT DOCUMENTS

| WO | 2010128007 | 11/2010 |
| WO | 2014074112 | 5/2014 |

OTHER PUBLICATIONS

International Search Report and Written Opinion of PCT Application No. PCT/US2014/05905 dated Jul. 20, 2015: pp. 1-27.
(Continued)

*Primary Examiner* — Angela M DiTrani Leff
(74) *Attorney, Agent, or Firm* — Chamberlain Hrdlicka

(57) ABSTRACT

Various embodiments disclosed relate to compositions including a plurality of capsules each independently comprising an outer wall and an inner compartment, the inner compartment independently comprising at least one of a first hardenable resin, a first hardener or activator, and a solvent, self-healing hardened resins formed from the same, and methods of using the same. In various embodiments, the present invention provides a method of treating a subterranean formation including placing the composition in a subterranean formation, and forming a selfhealing hardened resin in the subterranean formation from the composition.

15 Claims, 1 Drawing Sheet

(51) Int. Cl.
*C04B 20/10* (2006.01)
*C09K 8/467* (2006.01)
*C09K 8/44* (2006.01)
*C09K 8/70* (2006.01)
*C04B 26/02* (2006.01)

(52) U.S. Cl.
CPC ............ *C04B 40/0633* (2013.01); *C09K 8/44* (2013.01); *C09K 8/467* (2013.01); *C09K 8/70* (2013.01)

(56) References Cited

U.S. PATENT DOCUMENTS

| | | | |
|---|---|---|---|
| 8,063,171 | B2 | 11/2011 | Klein |
| 8,383,697 | B2 | 2/2013 | Wilson et al. |
| 8,460,792 | B2 | 6/2013 | Smets et al. |
| 2002/0022579 | A1 | 2/2002 | Griffith et al. |
| 2002/0033263 | A1 | 3/2002 | Chattwerji et al. |
| 2006/0037753 | A1 | 2/2006 | Hanes, Jr. |
| 2007/0187097 | A1* | 8/2007 | Weaver ............... C09K 8/68 166/280.2 |
| 2008/0299391 | A1 | 12/2008 | White et al. |
| 2012/0225497 | A1 | 9/2012 | Natrajan et al. |
| 2012/0321828 | A1 | 12/2012 | Jolley et al. |
| 2012/0325497 | A1 | 12/2012 | Kumar et al. |
| 2012/0328377 | A1 | 12/2012 | Brenneis et al. |

OTHER PUBLICATIONS

Blaiszik et al., "Self-Healing Polymers and Composites," Annu. Rev. Mater. Res., 2010, vol. 40: pp. 179-211.
Chen et al., "A Thermally Re-mendable Cross-Linked Polymeric Material," Science, Mar. 2002, vol. 295: pp. 1698-1702.
Garnier et al., SPE-160890-MS: "Effect of Acid Gas on Cement Sheath Integrity: Experimental Findings," SPE International, SPE Saudi Arabia Section Technical Symposium and Exhibition, Apr. 2012: pp. 1-10.
Jin et al., "Self-healing thermoset using encapsulated epoxy-amine healing chemistry," Polymer, 2012: pp. 1-7.
Jones et al., "Autonomic Healing of Carbon Fiber/Epoxy Interfaces," Appl. Mater. Interfaces, 2014, vol. 6: pp. 6033-6039.
White et al., "Autonomic healing of polymer composites," Nature, Feb. 2001, vol. 409: pp. 794-797.
White et al., "Self-healing Polymers and Composites," American Scientist, 2011, vol. 99: 99. 392-399.
Yuan et al., "Self-Healing Polymeric Materials Using Epoxy/Mercaptan as the Healant," Macromolecules, 2008, vol. 41(14): pp. 5197-5202.

* cited by examiner

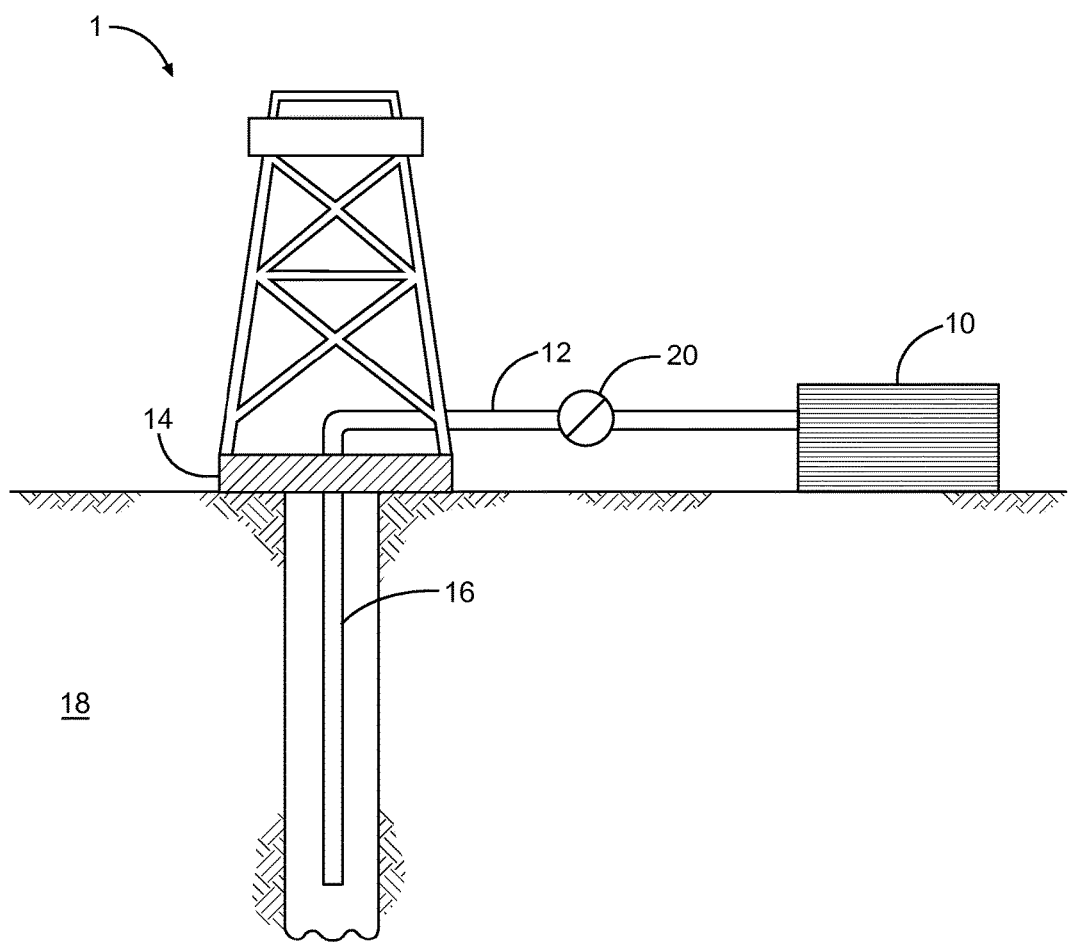

TREATMENT OF SUBTERRANEAN FORMATIONS WITH SELF-HEALING RESINS

BACKGROUND

Resins are used for a variety of subterranean treatments, including in primary and secondary cementing methods. For example, because resins have increased flexibility and toughness as compared to conventional cement compositions, they are used in applications where a large number of stress cycles are encountered. Corrosive gases like sour gas conditions can have negative impacts on cement, and are better tolerated by hardened resins. However, the harsh and stressed conditions experienced by a hardened resin can lead to formation of cracks, which can eventually lead to breakage. Cracks that form within hardened resins can be difficult to detect and almost impossible to repair.

BRIEF DESCRIPTION OF THE FIGURES

The drawings illustrate generally, by way of example, but not by way of limitation, various embodiments discussed in the present document.

FIG. 1 illustrates a system or apparatus for delivering a composition to a subterranean formation, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form $—NH_2$, $—NHR$, $—NR_2$, $—NR_3^+$, wherein each R is independently selected, and protonated forms of each, except for $—NR_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

The term "standard temperature and pressure" as used herein refers to 20° C. and 101 kPa.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, naphthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The polymers described herein can terminate in any suitable way. In some embodiments, the polymers can terminate with an end group that is independently chosen from a suitable polymerization initiator, —H, —OH, a substituted or unsubstituted ($C_1$-$C_{20}$)hydrocarbyl (e.g., ($C_1$-$C_{10}$)alkyl or ($C_6$-$C_{20}$)aryl) interrupted with 0, 1, 2, or 3 groups independently selected from —O—, substituted or unsubstituted —NH—, and —S—, a poly(substituted or unsubstituted ($C_1$-$C_{20}$)hydrocarbyloxy), and a poly(substituted or unsubstituted ($C_1$-$C_{20}$)hydrocarbylamino).

In various embodiments, the present invention provides a method of treating a subterranean formation. The method includes placing in a subterranean formation a composition comprising a plurality of capsules each independently comprising an outer wall and an inner compartment, the inner compartment independently comprising at least one of a first hardenable resin, a first hardener or activator, and a solvent. The method also includes forming a self-healing hardened resin in the subterranean formation from the composition.

In various embodiments, the present invention provides a method of treating a subterranean formation. The method includes placing in a subterranean formation a composition that includes a plurality of capsules having a diameter of about 0.1 micron to about 10 mm and each independently including an outer wall and an inner compartment. The inner compartment independently includes at least one of a first hardenable resin, a first hardener or activator, and a solvent. The composition also includes a material outside the outer wall of the plurality of capsules including at least one of a second hardenable resin, a second hardener, and a second activator. At least one of conditions (A), (B), and (C) is satisfied. Condition (A) is the composition includes the second hardenable resin and the inner compartment includes the first hardener, the first activator, or a combination thereof. Condition (B) is the composition includes the second hardener or activator and the inner compartment includes the hardenable resin. Condition (C) is the composition includes the second hardenable resin and the inner compartment includes the first solvent. The method also includes forming a self-healing hardened resin in the subterranean formation from the composition.

In various embodiments, the present invention provides a system including a self-healing hardened resin formed from a composition including a plurality of capsules each independently including an outer wall and an inner compartment, the inner compartment independently including at least one of a first hardenable resin, a first hardener or activator, and a solvent. The system also includes a subterranean formation including the self-healing hardened resin therein.

In various embodiments, the present invention provides a composition for treatment of a subterranean formation. The composition includes a plurality of capsules each independently including an outer wall and an inner compartment, the inner compartment independently including at least one of a first hardenable resin, a first hardener or activator, and a solvent.

In various embodiments, the present invention provides a self-healing hardened resin for treatment of a subterranean formation. The self-healing hardened resin includes a hardened resin. The self-healing hardened resin also includes a plurality of capsules each independently comprising an outer wall and an inner compartment, the inner compartment independently comprising at least one of a first hardenable resin, a first hardener or activator, and a solvent.

In various embodiments, the present invention provides a method of preparing a composition for treatment of a subterranean formation. The method includes forming a composition including a plurality of capsules each independently including an outer wall and an inner compartment, the inner compartment independently including at least one of a first hardenable resin, a first hardener or activator, and a solvent.

In various embodiments, the composition and self-healing hardened resin formed therefrom has certain advantages over other compositions for treatment of a subterranean formation. For example, in various embodiments, unlike other hardened resins and other materials, the hardened resins of the present invention can have self-healing properties. In various embodiments, the self-healing properties can allow the hardened resins to exist in harsh subterranean conditions without permanent damage for a longer period of time than other hardened resins and other materials. In various embodiments, the self-healing properties can allow the hardened resin to be used to a wider variety of subterranean treatments than other hardened resins. In various embodiments, the longer lifetime of the self-healing hardened resin can save costs by avoiding replacement of the hardened resin for a longer period of time, and by avoiding adverse effects on production caused by permanent damage to a hardened resin. Embodiments of the present invention can be easily tailored to suit particular well conditions, such as by adjusting the type of hardenable resin, the size of capsules, the material and thickness of capsule walls, and the type hardener or activator used.

In various embodiments, use of the composition in a primary or secondary cementing treatment at least partially in place of a cementing composition or in addition to a cementing composition, the hardened resin can have extended life compared to other resins and can give better cement sheath integrity. In various embodiments, the hardened resin can reduced the efforts and expenses related to remedial services. In various embodiments, preparation of the capsules can be easy and inexpensive.

Method of Treating A Subterranean Formation.

In various embodiments, the present invention provides a method of treating a subterranean formation. The method includes placing in a subterranean formation a composition including a plurality of capsules each independently including an outer wall and an inner compartment. The inner compartment of each the capsules independently includes at least one of a first hardenable resin, a first hardener or activator, and a solvent. The method also includes forming a self-healing hardened resin in the subterranean formation from the composition, such as by hardening the composition (e.g., curing, wherein the composition is a curable composition). A crack, break, scratch, or erosion in the hardened resin can cause at least some of the capsules to rupture or break, which can result in a chemical reaction of the contents of the ruptured capsules with at least one of other materials in the composition or materials in other ruptured capsules, thereby at least partially healing the crack, break, scratch, or erosion in the hardened resin. In various embodiments, the compositions can cure at desirable conditions and the hardened resins can provide extended life compared to other hardened resins. The hardened resin can have long-term stability under a variety of conditions, such as at least one of high stress, high temperature, high pressure, and corrosive conditions. The composition can be used to perform any suitable subterranean treatment, such as a wellbore cementing process, a wellbore repair operation, a consolidation procedure, or a fracturing procedure.

In some embodiments, the present invention provides a method of treating a subterranean formation. The method includes placing the composition in a subterranean formation. The placing of the composition in the subterranean formation can include contacting the composition and any suitable part of the subterranean formation, or contacting the composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a fracture, flow pathway, or area surrounding the same. In some embodiments, the method includes obtaining or providing the composition. The obtaining or providing of the composition can occur at any suitable time and at any suitable location. The obtaining or providing of the composition can occur above the surface. The obtaining or providing of the composition can occur in the subterranean formation (e.g., downhole).

In various embodiments, the method includes using the composition in a cementing procedure, such as primary or secondary cementing, for example, as a non-cementitious sealant. The composition can be pumped into an annulus between a wellbore and a tubular (e.g., a casing or drillstring) or between two tubulars, and the composition can be allowed to set or harden. In various embodiments, the composition can at least one of include cement, can be injected adjacent to cement, and can be used in place of cement. In some embodiments, the method can include placing the composition into a damaged region of a wellbore and then hardening the composition.

In various embodiments, the method includes consolidating particulates downhole. For example, the method can include placing the composition into a region of the subterranean formation that includes fines, gravel, or other particles, and allowing the composition to cure such that the particles are substantially fixed in-place. In various embodiments, the method can include lost-circulation management, such as by placing the composition in a subterranean region experiencing fluid loss and hardening the composition.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

In various embodiments, the composition can include at one of a first hardenable resin, a first hardener, a first activator, an encapsulated second hardenable resin, an encapsulated second hardener, and an encapsulated second activator. In some embodiments, the composition can include at least two or three or more members of the preceding list.

In various embodiments, the composition further includes material outside the outer wall of the plurality of capsules (e.g., prior to rupture of the capsules) including at least one of a second hardenable resin, and a second hardener or activator. In various embodiments, at least one of conditions (A), (B), and (C) is satisfied. Condition (A) is the composition includes the second hardenable resin and the inner compartment includes the first hardener or activator. Condition (B) is the composition includes the second hardener or activator and the inner compartment includes the first hardenable resin. Condition (C) is the composition includes the second hardenable resin and the inner compartment includes the first solvent. In various embodiments, the inner compartment of at least some of the plurality of capsules includes the first hardenable resin and the inner compartment of at least some of the plurality of capsules includes the first hardener or activator.

The method includes forming a hardened self-healing resin from the composition. The forming of the hardened resin can occur at least partially above-surface, such that a partial hardening occurs prior to placing the composition in the subterranean formation. The forming of the hardened resin of the composition can occur at least partially in the subterranean formation, such that all or part of the hardening occurs when the hardenable composition is downhole, such as when the hardenable composition is at a desired location downhole. The forming of the hardened resin can include curing the composition including the capsules (e.g., the composition can be a curable composition, at least one of prior to and after rupture of one or more capsules). The forming of the hardened resin can include allowing the composition including the capsules to harden, such as by curing (e.g., undergo a chemical reaction resulting in hardening), or such as by allowing a thermoplastic material in the composition to cool. The hardened resin can have any suitable hardness. Curing can occur for any suitable time, at any suitable temperature, and at any suitable pressure, such as for 10 minutes, 20, 30, 40, 50 minutes, 1 hour, 1.5, 2, 3, 4, 5, 6, 8, 10, 12, 14, 16, 18, 20, 22 hours, 1 day, 1.5, 2, 3, 4, 5, 6 days, 1 week, 1.5, 2, 3 weeks, or about 1 month or more, such as at about 0° C. to about 500° C., or about 20° C. to about 400° C., or about 0° C. or less, or about 10° C., 20, 25, 30, 35, 40, 45, 50, 60, 70, 80, 90, 100, 125, 150, 175, 200, 225, 250, 275, 300, 350, 400, 450, or about 500° C. or more.

In various embodiments, the method includes allowing damage to form in the cured product thereby rupturing one or more of the plurality of capsules, wherein release of contents of the inner compartment of the ruptured capsules at least partially heals the damage. The healing can be any suitable healing that results from the release of the contents of the inner compartment of at least some of the ruptured capsules, wherein the healing results in at least some repair or restoration of properties from the cracked or otherwise damaged state of the hardened resin. Healing the damage can include reaction of the contents of inner compartments of at least some of the ruptured capsules with at least some of the material that was outside the outer wall of the plurality of capsules prior to the rupturing. Healing the damage can include reaction of the contents of inner compartments of at least some of the ruptured capsules with contents of different inner compartments of at least some of the ruptured capsules. Healing the damage can include contacting the second hardenable resin with the first hardener or activator in the ruptured capsules. Healing the damage can include contacting the second hardener or activator with the first hardenable resin of the ruptured capsules. Healing the damage can include contacting the first hardenable resin of some of the ruptured capsules with the first hardener or activator of some of the ruptured capsules. Healing the damage can include contacting the first solvent of some of the ruptured capsules with a hardened resin formed from the second hardenable resin, such that the hardened resin softens and thereby flows into the crack. The solvent can be any one or more suitable solvents or carrier fluids. In some embodiments, the solvent is at least one of an oil, an aqueous solvent, and an organic solvent.

Capsules.

The composition includes a plurality of capsules. Each capsule independently includes an inner compartment and an outer wall. In some embodiments, all of the capsules include approximately the same composition in the inner compartment. In some embodiments, some of the capsules include a different composition in the inner compartment thereof than other capsules. In some embodiments, all of the capsules include about the same composition of material in their outer walls. In some embodiments, the composition of material in the outer walls of various capsules can differ. The capsules can be approximately uniform in size, or the capsules can vary in size. The capsules can have approximately the same thickness of the outer walls, or various capsules can have different thicknesses of outer walls. Upon damaging the hardened resin, at least some of the capsules rupture. The characteristics of the capsules can be tailored to the specific subterranean conditions and procedure such that the rupturing occurs at a desired time and to a desired extent, such as by varying the thickness of the outer walls, the composition of the outer walls, and the size of the capsules. The capsules can be generated in any suitable manner, such as using emulsion chemistry to form the outer walls around the inner compartment contents, or such as by first forming the outer walls and then filling the capsules in a suitable manner.

Any suitable proportion of the composition including the plurality of capsules can be the plurality of capsules. For example, about 0.001 wt % to about 99 wt % of the composition can be the plurality of capsules, or about 1 wt % to about 90 wt %, or about 10 wt % to about 80 wt %, or about 0.001 wt % or less, or about 0.01 wt %, 0.1, 1, 2, 3, 4, 5, 6, 8, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 wt % or more of the composition.

The capsules can have any suitable size or diameter. For irregularly (e.g., nonspherically) shaped capsules, the diameter or size can be the largest dimension of the capsule. For example, the capsules can have a diameter of about 0.1 micron to about 10 mm, about 1 micron to about 1 mm, or about 0.1 microns or less, or about 0.5 microns, 1, 2, 3, 4, 5, 6, 8, 10, 12, 14, 16, 18, 20, 30, 40, 50, 60, 70, 80, 90, 100, 150, 200, 250, 300, 400, 500, 600, 700, 800, 900 microns, 1 mm, 2, 3, 4, 5, 6, 7, 8, 9, or about 10 mm or more.

The outer walls of the capsules can have any suitable thickness. The outer walls can have an approximately even thickness for a given capsules. For example, the outer walls of the capsules can have a thickness of about 1 nm to about 1 mm, or about 10 nm to about 100 microns, or about 1 nm or less, or about 5 nm, 10, 20, 50, 100, 150, 200, 250, 500, 750 nm, 1 micron, 2, 3, 4, 5, 6, 8, 10, 12, 14, 16, 18, 20, 30, 40, 50, 60, 70, 80, 90, 100, 150, 200, 250, 300, 400, 500, 600, 700, 800, 900 microns, or about 1 mm or more.

The outer walls of the capsules can be made of any suitable one or more materials. For example, the outer walls of the capsules can include at least one of a polyethylene (e.g., polystyrene or polydivinyl benzene), polyamide, a polyester, a polycarbonate, a polycarbamate, a polyurethane, an epoxy-amine polymer, an isocyanate-amine polymer, an isocyanate-alcohol polymer, an epoxy-anhydride polymer, a urea-anhydride polymer, a urea-formaldehyde polymer, a melamine-formaldehyde polymer, a furan-based resin, a phenolic-based resin, a phenol-phenol formaldehyde-furfuryl alcohol resin, a gelatin, gum-arabic, a polyurea, a melamine resin, a nylon, polyvinyl alcohol, a paraffin, a cellulose, a polyether, alginic acid, and a polyimide.

Hardenable Resin and Hardener or Activator.

In various embodiments, the composition, the inner compartment of one or more capsules, or a combination thereof, can include one or more hardenable resins. The hardenable resin can be any suitable material that can be cured (e.g., via a chemical reaction, such as at least one of a polymerization reaction and a crosslinking reaction) to form a hardened material, or any suitable material that can harden in any other fashion (e.g., such as by cooling of a thermoplastic material). The hardenable resin is not restricted to having any particular viscosity, and can be a thin or thick fluid prior to hardening. Upon hardening, the hardenable resin can have any suitable hardness, such that it can be used to carry out at least one of the methods for treatment of a subterranean formation described herein.

As used herein, a hardenable resin that is in the inner compartment of the capsules (prior to rupturing of the capsules) is a first hardenable resin. As used herein, a hardenable resin that is in the composition but that is outside of the outer walls of the capsules (prior to rupturing of the capsules) is a second hardenable resin. The first and second hardenable resin, if both present, can be the same or different.

Any suitable proportion of the composition can be a hardenable resin. For example, about 0.01 wt % to about 99 wt % of the composition can be the second hardenable resin, or about 10 wt % to about 90 wt %, or about 0.01 wt % or less, or about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 wt % or more.

Any suitable proportion of the inner compartment of the capsules can be a hardenable resin. For example, about 0.01 wt % to about 100 wt % of the inner compartment can be the first hardenable resin, or about 10 wt % to about 90 wt %, or about 0.01 wt % or less, or about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 85, 90, 91, 92, 93, 94, 95, 96, 97, 98, 99 wt % or more, or about 100 wt %.

The first or second hardenable resin can be any suitable hardenable resin. For example, the hardenable resin can be at least one of a thermoplastic polymer or monomer thereof, a shellac, a polyamide monomer, a silyl-modified polyamide monomer, a polyester monomer, a polycarbonate monomer, a polycarbamate monomer, a polyurethane monomer, a natural resin, an epoxy-based resin monomer, a furan-based resin monomer, a phenolic-based resin monomer, a urea-aldehyde resin monomer, a phenol-phenol formaldehyde-furfuryl alcohol resin monomer, a diisocyanate resin monomer, a vinyl monomer, a $(C_1$-$C_{10})$alkyl acrylate ester monomer, a $(C_1$-$C_{10})$alkyl $(C_1$-$C_{10})$alkylacrylate ester monomer, an alkene-containing substituted or unsubstituted $(C_1$-$C_{50})$hydrocarbon, a cyclic olefin, a vinyl alcohol, a divinyl-substituted $(C_1$-$C_{10})$hydrocarbon, a disulfide-containing epoxy-resin monomer, a diaminopolyorganosiloxane, a diaminopolyalkyleneoxide, a polyorganosiloxane diol, and a polyalkyleneoxide diol.

The hardened resin formed by the composition can include at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol-phenol formaldehyde-furfuryl alcohol resin. In some embodiments, the hardened resin can be at least one of bisphenol A diglycidyl ether resin, butoxymethyl butyl glycidyl ether resin, bisphenol A-epichlorohydrin resin, and bisphenol F resin. In some embodiments, the hardened resin can be at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the hardened resin can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine. The hardenable resin can be any suitable material that can be cured or hardened to form any one or more of the foregoing.

In various embodiments, the composition includes a first or second hardenable resin that is an epoxy and a first or second hardener or activator that is an amine or anhydride, such that the hardened resin includes at least one of an epoxy-amine resin and an epoxy-anhydride resin. For example, the hardenable resin can include a polyepoxide-substituted mono- or poly($C_5$-$C_{20}$)aryl compound, wherein the ($C_5$-$C_{20}$)aryl is substituted or unsubstituted. Herein, an epoxide-substituted or amine-substituted organic group wherein the organic group is substituted or unsubstituted can have the epoxide or amine substituted on any one of the substituents of the organic group or substituted directly on the organic group itself. The first or second hardenable resin can be a diepoxide-substituted phenyl($C_1$-$C_{10}$)hydrocarbyl-phenyl, wherein the phenyl and ($C_1$-$C_{10}$)hydrocarbyl are each independently substituted or unsubstituted. The first or second hardenable resin can be a diglycidyl ether of bisphenol A (2-[[4-[2-[4-(oxiran-2-ylmethoxy)phenyl]propan-2-yl]phenoxy]methyl]oxirane). The hardenable resin can include diglycidyl terahydro-o-phthalate (DTHP). Examples hardenable resins include epoxy-functionalized monomers, prepolymers, or polymers.

The first or second hardenable resin can include at least one epoxide component that is an epoxide-substituted $(C_1-C_{10})$hydrocarbyl, wherein the $(C_1-C_{10})$hydrocarbyl can be independently substituted or unsubstituted. In some embodiments, the epoxide component can be a $(C_1-C_{10})$hydrocarbylglycidyl ether, such as butyl glycidyl ether. In various embodiments, the hardenable resin includes a combination an epoxide-substituted $(C_1-C_{10})$hydrocarbyl compound and a polyepoxide-substituted mono- or poly$(C_5-C_{20})$aryl compound, such as a combination of butyl glycidyl ether and a diglycidyl ether of bisphenol A.

The first or second hardenable resin can include at least one epoxide component that is a polyepoxide-substituted $(C_5-C_{20})$cycloalkyl compound, wherein the $(C_5-C_{20})$cycloalkyl is substituted or unsubstituted. The epoxide component can be cyclohexanedimethanol diglycidyl ether.

The hardener or activator can be any suitable material that can interact with a hardenable resin to cause or enable the hardenable resin to harden or cure, such as via polymerization or crosslinking. As used herein, a hardener or activator that is in the inner compartment of the capsules (prior to rupture of the capsules) is a first hardener or activator. As used herein, a hardener or activator that is in the composition outside the outer walls of the capsules (prior to rupturing of the capsules) is a second hardener or activator. In various embodiments, a hardenable resin described herein in relationship to a specific hardener or activator can also be referred to in an opposite relationship, wherein the hardener or activator can be considered the hardenable resin and wherein the hardenable resin can be considered the hardener or activator. A first hardener or activator and a second hardener or activator, if both present, can be the same or different.

Any suitable proportion of the composition can be the hardener or activator. For example, about 0.01 wt % to about 99 wt % of the composition is the second hardener or activator, or about 10 wt % to about 90 wt %, or about 0.01 wt % or less, or about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 85, 90, 91, 92, 93, 94, 95, 96, 97, 98, or about 99 wt % or more.

Any suitable proportion of the inner compartment can be the hardener or activator. For example, about 0.01 wt % to about 100 wt % of the inner compartment can be the first hardenable resin, or about 10 wt % to about 90 wt %, or about 0.01 wt % or less, or about 0.1 wt %, 1, 2, 3, 4, 5, 6, 7, 8, 9, 10, 12, 14, 16, 18, 20, 25, 30, 35, 40, 45, 50, 55, 60, 65, 70, 75, 80, 85, 90, 91, 92, 93, 94, 95, 96, 97, 98, 99 wt % or more, or about 100 wt %.

The first or second hardener or activator can be any suitable hardener or activator. For example, the hardener or activator can be at least one of an amine, a diamine, a polyamine, an alcohol, a diol, a polyol, a thiol, a dithiol, a polythiol, a dialdehyde, a polyaldehyde, a urea, a disulfide, an anhydride, a dianhydride, an ethylenically unsaturated substituted or unsubstituted $(C_2-C_{50})$hydrocarbon, a free-radical initiator, and a catalyst.

The hardener or activator can be any suitable curing agent. For example, the curing agent can include at least one of an amine, an aromatic amine, an aliphatic amine, a cyclo-aliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris(dimethylaminomethyl)phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenanthroline, phenazine, imidazolidine, phenoxazine, cinnoline, pyrrolidine, pyrroline, imidazoline, piperidine, indoline, isoindoline, quinuclidine, morpholine, azocine, azepine, 1,3,5-triazine, thiazole, pteridine, dihydroquinoline, hexamethyleneimine, indazole, 2-ethyl-4-methyl imidazole, 1,1,3-trichlorotrifluoroacetone, and combinations thereof.

In some embodiments, the hardener or activator can include an amine-containing polymer. In some embodiments, the hardener or activator can be hydrophobically-modified. In some embodiments, the hardener or activator can include at least one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one $(C_4-C_{30})$hydrocarbyl including at least one of a straight chain, a branched chain, an unsaturated C—C bond, an aryl group, and any combination thereof.

The hardener or activator can include at least one amine component that is a polyamine-substituted $(C_1-C_{30})$hydrocarbyl, wherein the $(C_1-C_{30})$hydrocarbyl and each amine are independently substituted or unsubstituted, in any suitable proportion of the composition, such as about 5 wt % to about 50 wt %, about 10 wt % to about 30 wt %, about 5 wt % or less, or about 10 wt %, 15, 20, 25, 30, 35, 40, 45, or about 50 wt % or more. The amine component can be a bis(amino$(C_0-C_5)$hydrocarbyl)$(C_6-C_{20})$aryl compound, wherein the $(C_6-C_{20})$aryl, $(C_0-C_5)$hydrocarbyl, and each amine are each independently substituted or unsubstituted. The amine component can be diethyltoluenediamine. The hardener or activator include at least one amine component that is a polyamine-substituted poly$((C_2-C_5)$hydrocarbyloxy), wherein each $(C_2-C_5)$hydrocarbyloxy and each amine are independently substituted or unsubstituted. The amine component can be polyoxypropylene diamine. The hardener or activator can include an amine component that is a mono- or polyamino$(C_0-C_{10})$hydrocarbyl$(C_6-C_{20})$aryl compound, wherein the $(C_0-C_{10})$hydrocarbyl, $(C_6-C_{20})$aryl, and each amine are each independently substituted or unsubstituted, wherein the resin can include any suitable amount of the mono- or polyamino$(C_0-C_{10})$hydrocarbyl$(C_6-C_{20})$aryl compound. The amine component can be a tris(amino$(C_1-C_3)$hydrocarbyl)benzene, wherein the $(C_1-C_3)$hydrocarbyl, the benzene, and each amine are independently substituted or unsubstituted. The amine component can be 2,4,6-tris(dimethylaminomethyl)phenol.

In various embodiments, the first or second hardenable resin can include a polymer including disulfide groups, such as an epoxy resin comprising disulfide groups (e.g., an epoxy-resin containing hardeners or activator, or epoxy-resins including disulfide groups and crosslinked by via amine hardeners or activators or by other curing chemistry), or can include allyl monomers containing disulfide groups in their structure (e.g., 3-(allyldisulfanyl)-i-propene). In some examples, such first or second hardenable resins can be used with first or second hardener or activators that are an amine curing agent, a thiol (e.g., trifunctional thiols) as crosslinkers, or a difunctional primary amine with disulfide groups in its structure (e.g., 2-[(2-aminoethyl)disulfanyl]ethylamine). In some embodiments, the hardener or activator can be diethylenetriamine (DETA), or a mercaptin (e.g., mono-, di-, or poly-), such as pentaerythritol tetrakis(3-mercaptopropionate). In various embodiments, the hardener or activator can be an amine (e.g., mono-, di-, or poly-) such as diethylenetriamine and the hardenable resin can be n-butyl glycidyl ether.

In various embodiments, the hardenable resin can include polyimide-monomer, polyurea-monomer, polyurethane-monomer, polyamide-monomer, or polyester-monomer. The hardenable resin can be an amine or alcohol and the hardener or activator cam be an anhydride, or vice versa. The hardenable resin can be a diisocyanate and the hardener or activator can be an amine or alcohol, or vice versa. Amines or diols can be poly(alkylene oxy)diamines or diols, poly (alkylsiloxy)diamines or diols, or aromatic diamines or diols. Anhydrides can be aromatic anhydrides such as biphenol A dianhydride (BPADA), biphenyl dianhydride (BPDA), or benzophenone-3,3',4,4'-tetracarboxylic dianhydride. In various embodiments an amine has the structure $H_2N—(C_2-C_6)alkyl-[O—(C_2-C_6)alkyl-]_nO—(C_2-C_6)alkyl-NH_2$ or $H_2N—(C_2-C_6)alkyl-O—Si(CH_3)_2—[O—Si(CH_3)_2—]_nO—Si(CH_3)_2—O—(C_2-C_6)alkyl-NH_2$. In various embodiments, an alcohol has the structure $HO—(C_2-C_6)alkyl-[O—(C_2-C_6)alkyl-]_nO—(C_2-C_6)alkyl-OH$ or $HO—(C_2-C_6)alkyl-O—Si(CH_3)_2—[O—Si(CH_3)_2—]_nO—Si(CH_3)_2—O—(C_2-C_6)alkyl-OH$. In various embodiments, the hardened resins formed from such hardenable resins and hardeners or activators can be softened in the presence of a solvent, such as a solvent release from a ruptured capsule, allowing the hardened resin to flow at least in part into a crack or other damage, thereby self-healing the hardened resin.

In some embodiments, the hardenable resin can include an alkene-functionalized monomer, prepolymer, or polymers, which may form a polymer when contacted with other alkene groups. Examples of alkene-functionalized polymerizers include monomers such as acrylates; alkylacrylates including methacrylates and ethacrylates; olefins including styrenes, isoprene and butadiene; and cyclic olefins including dicyclopentadiene (DCPD), norbornene and cyclooctadiene. Examples of alkene-functionalized polymerizers also include diallyl phthalate (DAP), diallyl isophthalate (DAIP), triallyl isocyanurate, hexanediol diacrylate (HDDA), trimethylol propanetriacrylate (TMPTA), and epoxy vinyl ester prepolymers and polymers. In some embodiments, the hardenable resin can include an acrylate monomer (e.g., a $(C_1-C_{20})$alkyl acrylic acid ester) or a akylacrylarate monomer (e.g., methyl methacrylate (MMA). Examples of monomers include methyl methacrylate (MMA), butyl methacrylate (BMA), 2,2-bis[4(2-hydroxy-3-methacryloxypropoxy) phenol]propane (Bis-GMA), trimethylolpropane trimethacrylate (TMPTMA), ethylene glycol dimethacrylate (EGDMA), and styrene. Examples of hardenable resins can include cyclic olefins, for example, containing 4-50 carbon atoms and optionally containing heteroatoms, such as dicyclopentadiene (DCPD), substituted DCPD, norbornene, substituted norbornene, cyclooctadiene, and substituted cyclooctadiene.

In various embodiments, the hardenable resin can include a member selected from the group consisting of a cyclic olefin (e.g., dicyclopentadiene), an unsaturated monomer, a lactone, a lactam, an epoxy-functional monomer, and a functionalized siloxane. In some embodiments, the hardener or activator can include N,N-dimethylaniline (DMA), 4,N,N-trimethylaniline (DMT), or 4,4'-methylene-bis(N,N-dimethyl)aniline (MBDMA). The hardener or activator can include dimethylamino-p-toluidine (DMPT), dimethylaniline (DMA), or a free-radical initiator (e.g., peroxide initiator, such as benzoyl peroxide, benzoyl peroxide (BPO), lauroyl peroxide (LPO), methyl ethyl ketone peroxide (MEKP), tert-butyl peroxide (TBP), tert-butyl peroxybenzoate (TBPB))

Examples of hardenable resins also include lactones (such as caprolactone) and lactams, which, when polymerized, can form polyesters and nylons, respectively. Examples of hardenable resins can include functionalized siloxanes, such as siloxane prepolymers and polysiloxanes having two or more reactive groups. Functionalized siloxanes can include, for example, silanol-functional siloxanes, alkoxy-functional siloxanes, and allyl- or vinyl-functional siloxanes.

In various embodiments, the hardener or activator includes a peroxide, which can, for example, form a radical to cause polymerization of an unsaturated monomer; a monomer of a multi-monomer polymer system, such as a diol, a diamine, and an epoxide; and amines, which can, for example, form a polymer with an epoxide.

In various embodiments, the hardenable resin can include copolymers including poly(ester amides) synthesized from ethylene glycol, azelaic acid, and 11-aminoundecanoic acid, wherein said polymeric material is characterized with a melt index above about 2.5 g/10 min. as determined by mass flow rate under ASTM D1238 at 190° C./2.16 kg.

In some embodiments, the hardener or activator can be a catalyst, such as a ring-opening metathesis catalyst, such as a Grubbs catalyst. Such as hardener or activator can be used with a cyclic alkene as the hardenable resin, such as dicyclopentadiene. The catalyst can be a platinum catalyst or a tin catalyst (e.g., di-n-butyltin dilaurate), that can be used in conjunction with a organopolysiloxane such as polydimethylsiloxane, wherein a hydrosilylation reaction occurs during the hardening. The catalyst can be a Lewis acid such as boron trifluoride diethyl etherate which can be used in conjunction with an epoxy hardenable resin.

In various embodiments, the first or second hardenable resin can include a) the product of a reaction between epichlorohydrin and bisphenol A, b) a polyepoxide resin, or c) a combination thereof. In various embodiments, the first or second hardenable resin can include at least one of butyl glycidyl ether, butyl lactate, cyclohexane dimethanol diglycidyl ether, and neo pentylglycol diglycidyl ether. In various embodiments, the first or second hardening agent can include a) diethyl toluene diamine, b) 4,4-diamino diphenyl sulfone, c) a cycloalkylamine or polyamine, d) 3-(aminomethyl)-3,5,5-trimethylcyclohexanamine, e) a composition including a polyamine, ethylene diamine, and bisphenol A, f) isophorone diamine, and g) combinations thereof.

Other Components.

The composition including the plurality of capsules, a mixture including the composition, the inner compartment of one or more of the capsules, or the outer walls of one or more of the capsules, can include any suitable additional component in any suitable proportion, such that the composition or mixture including the same can be used as described herein.

In some embodiments, the composition or the inner compartment of one or more of the capsules includes one or more viscosifiers. The viscosifier can be any suitable viscosifier. The viscosifier can affect the viscosity of the composition, the materials in the inner compartment, or a solvent that contacts the composition or the contents of the inner compartment at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location, such as after one or more capsules rupture. In some embodiments, the viscosifier can be about 0.000,1 wt % to about 10 wt % of the composition or a mixture including the same, or of the contents of one or more inner compartments, or about 0.004 wt % to about 0.01 wt %, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly($(C_2-C_{10})$alkene), wherein the $(C_2-C_{10})$ alkene is substituted or unsubstituted. The viscosifier can include at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted $(C_2-C_{50})$hydrocarbyl having at least one aliphatic unsaturated C—C bond therein, and a substituted or unsubstituted $(C_2-C_{50})$alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted $(C_1-C_{20})$alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted $(C_1-C_{20})$alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted $(C_1-C_{20})$alkenoic substituted or unsubstituted $(C_1-C_{20})$alkanoic anhydride, a substituted or unsubstituted $(C_1-C_{20})$alkenoic substituted or unsubstituted $(C_1-C_{20})$alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—$(C_1-C_{10})$alkenyl nitrogen containing substituted or unsubstituted $(C_1-C_{10})$heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition including the plurality of capsules, a mixture including the composition, the inner compartment of one of more of the capsules, or the outer walls of one or more of the capsules can include one or more crosslinkers. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$)alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition including the plurality of capsules, a mixture including the composition, the inner compartment of one of more of the capsules, or the outer walls of one or more of the capsules, about 0.001 wt % to about 0.01 wt %, or about 0.000,01 wt % or less, or about 0.000,05 wt %, 0.0001, 0.000,5, 0.001, 0.005, 0.01, 0.05, 0.1, 0.5, 1, 2, 3, 4, or about 5 wt % or more.

In some embodiments, the composition, a mixture including the same, or the inner compartment of one or more capsules, can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the composition or a mixture including the same, or of the inner compartment of one or more capsules, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition including the plurality of capsules, a mixture including the composition, the inner compartment of one of more of the capsules, or the outer walls of one or more of the capsules, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, naphthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the composition including the plurality of capsules, a mixture including the composition, the inner compartment of one of more of the capsules, or the outer walls of one or more of the capsules, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the capsules or a mixture including the same can include any suitable downhole fluid. The composition including the capsules can be combined with any suitable downhole fluid before, during, or after the placement of the composition in the subterranean formation or the contacting of the composition and the subterranean material. In some examples, the composition including the capsules is combined with a downhole fluid above the surface, and then the combined composition is placed in a subterranean formation or contacted with a subterranean material. In another example, the composition including the capsules is injected into a subterranean formation to combine with a downhole fluid, and the combined composition is contacted with a subterranean material or is considered to be placed in the subterranean formation. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, composition including the plurality of capsules, a mixture including the composition, the inner compartment of one of more of the capsules, or the outer walls of one or more of the capsules, can include any suitable amount of any suitable material used in a downhole fluid. For example, composition including the plurality of capsules, a mixture including the composition, the inner compartment of one of more of the capsules, or the outer walls of one or more of the capsules can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the composition including the plurality of capsules, a mixture including the composition, the inner compartment of one of more of the capsules, or the outer walls of one or more of the capsules can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPER-MUL™, EZ MUL® NT, and FORTI-MUL® emulsifiers; DRIL TREAT® oil wetting agent for heavy fluids; BARAC-ARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the composition including the plurality of capsules, a mixture including the composition, the inner compartment of one of more of the capsules, or the outer walls of one or more of the capsules can include one or more additive components such as: X-TEND® II, PAC™-R, PAC™-L, LIQUI-VIS® EP, BRINEDRIL-VIS™, BARAZAN®, N-VIS®, and AQUAGEL® viscosifiers; THERMA-CHEK®, N-DRIL™, N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUDLUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the composition including the plurality of capsules, a mixture including the composition, the inner compartment of one of more of the capsules, or the outer walls of one or more of the capsules can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the composition including the plurality of capsules, a mixture including the composition, the inner compartment of one of more of the capsules, or the outer walls of one or more of the capsules in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the plurality of capsules, a mixture including the composition, or the inner compartment of one of more of the capsules. The cement kiln dust can be any suitable cement kiln dust. Cement kiln dust can be formed during the manufacture of cement and can be partially calcined kiln feed that is removed from the gas stream and collected in a dust collector during a manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention; for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, about 0 wt % to about 95 wt %, about 20 wt % to about 95 wt %, or about 50 wt % to about 90 wt %. A cement kiln dust can be present in an amount of at least about 0.01 wt %, or about 5 wt % to about 80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in composition including the plurality of capsules, a mixture including the composition, the inner compartment of one of more of the capsules, or the outer walls of one or more of the capsules. For example, composition including the plurality of capsules, a mixture including the composition, the inner compartment of one of more of the capsules, or the outer walls of one or more of the capsules can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the composition or mixture including the same can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a plurality of capsules each independently comprising an outer wall and an inner compartment, the inner compartment independently comprising at least one of a first hardenable resin, a first hardener or activator, and a solvent. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a cementing operation, a fracturing operation (e.g., pre-pad, pad, slurry, or finishing stages), a remedial treatment operation, or a consolidation operation. In various embodiments, the system or apparatus can include a pump fluidly coupled to a tubular (e.g., any suitable type of oilfield pipe, such as pipeline, drill pipe, production tubing, and the like), with the tubular containing a composition including the plurality of capsules described herein.

In some embodiments, the system can include a drill string disposed in a wellbore, with the drill string including a drill bit at a downhole end of the drill string. The system can also include an annulus between the drill string and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

FIG. 1 shows an illustrative schematic of systems and apparatuses that can deliver embodiments of the compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like. Although not depicted in FIG. 1, at least part of the composition can, in some embodiments, flow back to wellhead 14 and exit subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a composition for treatment of a subterranean formation. The composition can be any suitable composition that can be used to perform an embodiment of the method for treatment of a subterranean formation described herein, or any suitable composition that is formed by an embodiment of the method of treatment of a subterranean formation described herein. For example, the composition can include a plurality of capsules each independently including an outer wall and an inner compartment, the inner compartment independently including at least one of a first hardenable resin, a first hardener or activator, and a solvent.

In some embodiments, the present invention provides a self-healing hardened resin, such as any self-healing hardened resin provided by any embodiment of the method of treating a subterranean formation described herein. For example, the self-healing hardened resin can include a hardened resin and a plurality of capsules each independently including an outer wall and an inner compartment, the inner compartment independently including at least one of a first hardenable resin, a first hardener or activator, and a solvent.

In some embodiments, the composition further includes a downhole fluid. The downhole fluid can be any suitable downhole fluid. In some embodiments, the downhole fluid is a composition for fracturing of a subterranean formation or subterranean material, or a fracturing fluid, a cementing fluid, a consolidation fluid, a remedial treatment fluid, or a fracturing fluid.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a plurality of capsules each independently including an outer wall and an inner compartment, the inner compartment independently including at least one of a first hardenable resin, a first hardener or activator, and a solvent.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:

placing in a subterranean formation a composition comprising a plurality of capsules each independently comprising an outer wall and an inner compartment, the inner compartment independently comprising at least one of a first hardenable resin, a first hardener or activator, and a solvent; and forming a self-healing hardened resin in the subterranean formation from the composition.

Embodiment 2 provides the method of Embodiment 1, wherein the composition further comprises a material outside the outer wall of the plurality of capsules comprising at least one of a second hardenable resin, and a second hardener or activator.

Embodiment 3 provides the method of Embodiment 2, wherein at least one of:

the composition comprises the second hardenable resin and the inner compartment comprises the first hardener or activator, the composition comprises the second hardenable resin and the inner compartment comprises the first hardener or activator, and the composition comprises the second hardenable resin and the inner compartment comprises the first solvent.

Embodiment 4 provides the method of any one of Embodiments 1-3, wherein the inner compartment of at least some of the plurality of capsules comprises the first hardenable resin and the inner compartment of at least some of the plurality of capsules comprises the first hardener or activator.

Embodiment 5 provides the method of any one of Embodiments 1-4, wherein the method further comprises obtaining or providing the composition, wherein the obtaining or providing of the composition occurs above-surface.

Embodiment 6 provides the method of any one of Embodiments 1-5, wherein the method further comprises obtaining or providing the composition, wherein the obtaining or providing of the composition occurs in the subterranean formation.

Embodiment 7 provides the method of any one of Embodiments 1-6, wherein the method comprises cementing the subterranean formation.

Embodiment 8 provides the method of any one of Embodiments 1-7, wherein the method comprises using the composition at least partially in place of a cementing fluid or in addition to the cementing fluid in a cementing treatment of the subterranean formation.

Embodiment 9 provides the method of any one of Embodiments 1-8, wherein the method comprises fracturing the subterranean formation.

Embodiment 10 provides the method of any one of Embodiments 1-9, wherein the method comprises consolidating the subterranean formation.

Embodiment 11 provides the method of any one of Embodiments 1-10, comprising curing the composition, to form a cured product of the composition, wherein the hardened resin comprises the cured product of the composition.

Embodiment 12 provides the method of Embodiment 11, wherein the curing occurs above-surface.

Embodiment 13 provides the method of any one of Embodiments 11-12, wherein the curing occurs in the subterranean formation.

Embodiment 14 provides the method of any one of Embodiments 11-13, wherein the cured product is self-healing.

Embodiment 15 provides the method of any one of Embodiments 11-14, further comprising allowing damage to form in the cured product thereby rupturing one or more of the plurality of capsules, wherein release of contents of the inner compartment of the ruptured capsules at least partially heals the damage.

Embodiment 16 provides the method of Embodiment 15, wherein healing the damage comprises reaction of the contents of inner compartments of at least some of the ruptured capsules with at least some of the material that was outside the outer wall of the plurality of capsules prior to the rupturing.

Embodiment 17 provides the method of any one of Embodiments 15-16, wherein healing the damage comprises reaction of the contents of inner compartments of at least some of the ruptured capsules with contents of different inner compartments of at least some of the ruptured capsules.

Embodiment 18 provides the method of any one of Embodiments 15-17, wherein healing comprises contacting the second hardenable resin with the first hardener or activator in the ruptured capsules.

Embodiment 19 provides the method of any one of Embodiments 2-18, wherein the method comprises
curing the composition, to form a cured product of the composition, wherein the hardened resin comprises the cured product of the composition; and
allowing damage to form in the cured product thereby rupturing one or more of the plurality of capsules, wherein release of contents of the inner compartment of the ruptured capsules at least partially heals the damage;
wherein the healing comprises contacting the second hardener or activator with the first hardenable resin of the ruptured capsules.

Embodiment 20 provides the method of any one of Embodiments 2-19, wherein the method comprises
curing the composition, to form a cured product of the composition, wherein the hardened resin comprises the cured product of the composition; and
allowing damage to form in the cured product thereby rupturing one or more of the plurality of capsules, wherein release of contents of the inner compartment of the ruptured capsules at least partially heals the damage;
wherein the healing comprises contacting the first hardenable resin of some of the ruptured capsules with the first hardener or activator of some of the ruptured capsules.

Embodiment 21 provides the method of any one of Embodiments 2-20, wherein the method comprises
curing the composition, to form a cured product of the composition, wherein the hardened resin comprises the cured product of the composition; and
allowing damage to form in the cured product thereby rupturing one or more of the plurality of capsules, wherein release of contents of the inner compartment of the ruptured capsules at least partially heals the damage;
wherein the healing comprises contacting the first solvent of some of the ruptured capsules with a hardened resin formed from the second hardenable resin.

Embodiment 22 provides the method of any one of Embodiments 1-21, wherein about 0.01 wt % to about 100 wt % of the inner compartment is the first hardenable resin.

Embodiment 23 provides the method of any one of Embodiments 1-22, wherein about 10 wt % to about 90 wt % of the inner compartment is the first hardenable resin.

Embodiment 24 provides the method of any one of Embodiments 1-23, wherein the first hardenable resin comprises at least one of at least one of a thermoplastic polymer or monomer thereof, a shellac, a polyamide monomer, a silyl-modified polyamide monomer, a polyester monomer, a polycarbonate monomer, a polycarbamate monomer, a polyurethane monomer, a natural resin, an epoxy-based resin monomer, a furan-based resin monomer, a phenolic-based resin monomer, a urea-aldehyde resin monomer, a phenol-phenol formaldehyde-furfuryl alcohol resin monomer, a diisocyanate resin monomer, a vinyl monomer, a $(C_1-C_{10})$ alkyl acrylate ester monomer, a $(C_1-C_{10})$alkyl $(C_1-C_{10})$ alkylacrylate ester monomer, an alkene-containing substituted or unsubstituted $(C_1-C_{50})$hydrocarbon, a cyclic olefin, a vinyl alcohol, a divinyl-substituted $(C_1-C_{10})$hydrocarbon, a disulfide-containing epoxy-resin monomer, a diaminopolyorganosiloxane, a diaminopolyalkyleneoxide, a polyorganosiloxane diol, and a polyalkyleneoxide diol.

Embodiment 25 provides the method of any one of Embodiments 1-24, wherein about 0.01 wt % to about 100 wt % of the inner compartment is the first hardener or activator.

Embodiment 26 provides the method of any one of Embodiments 1-25, wherein about 10 wt % to about 90 wt % of the inner compartment is the first hardener or activator.

Embodiment 27 provides the method of any one of Embodiments 1-26, wherein the first hardener or first activator comprises at least one of an amine, a diamine, a polyamine, an alcohol, a diol, a polyol, a thiol, a dithiol, a polythiol, a dialdehyde, a polyaldehyde, a urea, a disulfide, an anhydride, a dianhydride, an ethylenically unsaturated substituted or unsubstituted $(C_2-C_{50})$hydrocarbon, a free-radical initiator, and a catalyst.

Embodiment 28 provides the method of any one of Embodiments 2-27, wherein about 0.01 wt % to about 99 wt % of the composition is the second hardenable resin.

Embodiment 29 provides the method of any one of Embodiments 2-28, wherein about 10 wt % to about 90 wt % of the composition is the second hardenable resin.

Embodiment 30 provides the method of any one of Embodiments 2-29, wherein the second hardenable resin comprises at least one of a thermoplastic polymer or monomer thereof, a shellac, a polyamide monomer, a silyl-modified polyamide monomer, a polyester monomer, a polycarbonate monomer, a polycarbamate monomer, a polyurethane monomer, a natural resin, an epoxy-based resin monomer, a furan-based resin monomer, a phenolic-based resin monomer, a urea-aldehyde resin monomer, a phenol-phenol formaldehyde-furfuryl alcohol resin monomer, a diisocyanate resin monomer, a vinyl monomer, a $(C_1-C_{10})$ alkyl acrylate ester monomer, a $(C_1-C_{10})$alkyl $(C_1-C_{10})$ alkylacrylate ester monomer, an alkene-containing substituted or unsubstituted $(C_1-C_{50})$hydrocarbon, a cyclic olefin, a vinyl alcohol, a divinyl-substituted $(C_1-C_{10})$hydrocarbon, a disulfide-containing epoxy-resin monomer, a diaminopolyorganosiloxane, a diaminopolyalkyleneoxide, a polyorganosiloxane diol, and a polyalkyleneoxide diol.

Embodiment 31 provides the method of any one of Embodiments 2-30, wherein about 0.01 wt % to about 99 wt % of the composition is the second hardener or second activator.

Embodiment 32 provides the method of any one of Embodiments 2-31, wherein about 10 wt % to about 90 wt % of the composition is the second hardener or second activator.

Embodiment 33 provides the method of any one of Embodiments 2-32, wherein the second hardener or activator comprises at least one of an amine, a diamine, a polyamine, an alcohol, a diol, a polyol, a thiol, a dithiol, a polythiol, a dialdehyde, a polyaldehyde, a urea, a disulfide, an anhydride, a dianhydride, an ethylenically unsaturated substituted or unsubstituted $(C_2-C_{50})$hydrocarbon, a free-radical initiator, and a catalyst.

Embodiment 34 provides the method of any one of Embodiments 1-33, wherein the first solvent comprises at least one of an oil, an aqueous solvent, and an organic solvent.

Embodiment 35 provides the method of any one of Embodiments 1-34, wherein the capsules have a diameter of about 0.1 micron to about 10 mm.

Embodiment 36 provides the method of any one of Embodiments 1-35, wherein the capsules have a diameter of about 1 micron to about 1 mm.

Embodiment 37 provides the method of any one of Embodiments 1-36, wherein the outer wall of the capsules have a thickness of about 1 nm to about 1 mm.

Embodiment 38 provides the method of any one of Embodiments 1-37, wherein the outer wall of the capsules have a thickness of about 10 nm to about 100 microns.

Embodiment 39 provides the method of any one of Embodiments 1-38, wherein the outer wall of the capsules comprise at least one of a polyethylene, polyamide, a polyester, a polycarbonate, a polycarbamate, a polyurethane, an epoxy-amine polymer, an isocyanate-amine polymer, an isocyanate-alcohol polymer, an epoxy-anhydride polymer, a urea-anhydride polymer, a urea-formaldehyde polymer, a melamine-formaldehyde polymer, a furan-based resin, a phenolic-based resin, a phenol-phenol formaldehyde-furfuryl alcohol resin, a gelatin, gum-arabic, a polyurea, a melamine resin, a nylon, polyvinyl alcohol, a paraffin, a cellulose, a polyether, alginic acid, and a polyimide.

Embodiment 40 provides the method of any one of Embodiments 1-39, wherein at least one of the composition, the outer walls, and the inner compartment further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 41 provides the method of any one of Embodiments 1-40, wherein the placing of the composition in the subterranean formation comprises fracturing at least part of the subterranean formation to form at least one subterranean fracture.

Embodiment 42 provides the method of any one of Embodiments 1-41, wherein the composition further comprises a proppant, a resin-coated proppant, or a combination thereof.

Embodiment 43 provides the method of any one of Embodiments 1-42, wherein the placing of the composition in the subterranean formation comprises pumping the composition through a tubular disposed in a wellbore and into the subterranean formation.

Embodiment 44 provides a system for performing the method of any one of Embodiments 1-43, the system comprising:
a tubular disposed in the subterranean formation; and
a pump configured to pump the composition in the subterranean formation through the tubular.

Embodiment 45 provides the self-healing hardened resin formed by the method of any one of Embodiments 1-43.

Embodiment 46 provides a system comprising the subterranean formation comprising the self-healing hardened resin formed by the method of any one of Embodiments 1-43.

Embodiment 47 provides a method of treating a subterranean formation, the method comprising:
placing in a subterranean formation a composition comprising
a plurality of capsules having a diameter of about 0.1 micron to about 10 mm and each independently comprising an outer wall and an inner compartment, the inner compartment independently comprising at least one of a first hardenable resin, a first hardener or activator, and a solvent; and
a material outside the outer wall of the plurality of capsules comprising at least one of a second hardenable resin, a second hardener, and a second activator, wherein at least one of
the composition comprises the second hardenable resin and the inner compartment comprises the first hardener, the first activator, or a combination thereof,
the composition comprises the second hardenable resin and the inner compartment comprises the first hardener, the first activator, or a combination thereof, and
the composition comprises the second hardenable resin and the inner compartment comprises the first solvent; and
forming a self-healing hardened resin in the subterranean formation from the composition.

Embodiment 48 provides a system comprising:
a self-healing hardened resin formed from a composition comprising a plurality of capsules each independently comprising an outer wall and an inner compartment, the inner compartment independently comprising at least one of a first hardenable resin, a first hardener or activator, and a solvent; and
a subterranean formation comprising the self-healing hardened resin therein.

Embodiment 49 provides the system of Embodiment 48, further comprising
a tubular disposed in the subterranean formation; and
a pump configured to pump the composition in the subterranean formation through the tubular.

Embodiment 50 provides a composition for treatment of a subterranean formation, the composition comprising:
a plurality of capsules each independently comprising an outer wall and an inner compartment, the inner compartment independently comprising at least one of a first hardenable resin, a first hardener or activator, and a solvent.

Embodiment 51 provides the composition of Embodiment 50, wherein the composition further comprises a downhole fluid.

Embodiment 52 provides a self-healing hardened resin formed from the composition of any one of Embodiments 50-51.

Embodiment 53 provides a self-healing hardened resin for treatment of a subterranean formation, the self-healing hardened resin comprising:
a hardened resin; and
a plurality of capsules each independently comprising an outer wall and an inner compartment, the inner compartment independently comprising at least one of a first hardenable resin, a first hardener or activator, and a solvent.

Embodiment 54 provides a method of preparing a composition for treatment of a subterranean formation, the method comprising:
forming a composition comprising
a plurality of capsules each independently comprising an outer wall and an inner compartment, the inner compartment independently comprising at least one of a first hardenable resin, a first hardener or activator, and a solvent.

Embodiment 55 provides the composition, method, or system of any one or any combination of Embodiments 1-54 optionally configured such that all elements or options recited are available to use or select from.

What is claimed is:

1. A method of treating a subterranean formation, comprising:
   placing a tubular in the subterranean formation;
   pumping, via a pump, a composition in a subterranean formation through the tubular, the composition comprising a first hardenable resin and a plurality of capsules, wherein some of the capsules contain a second hardenable resin, other capsules contain a first hardener or activator, and others contain a solvent; and
   forming a hardened resin in the subterranean formation from the first hardenable resin with the plurality of capsules still intact.

2. The method of claim 1, wherein the composition further comprises a second hardener or activator outside the plurality of capsules.

3. The method of claim 2, further comprising:
   allowing damage to form in the hardened resin thereby rupturing one or more of the plurality of capsules, wherein release of contents of the ruptured capsules at least partially heals the damage;
   wherein the healing comprises contacting the second hardener or activator with the second hardenable resin of the ruptured capsules.

4. The method of claim 2, wherein the second hardener or activator comprises at least one of an amine, a diamine, a polyamine, an alcohol, a diol, a polyol, a thiol, a dithiol, a polythiol, a dialdehyde, a polyaldehyde, a urea, a disulfide, an anhydride, a dianhydride, or an ethylenically unsaturated substituted or unsubstituted (C2-C50)hydrocarbon.

5. The method of claim 1, further comprising allowing damage to form in the hardened resin thereby rupturing one or more of the plurality of capsules, wherein release of contents of the ruptured capsules at least partially heals the damage.

6. The method of claim 5, wherein healing the damage comprises reaction of the contents of the ruptured capsules with at least some of the material that was outside of the plurality of capsules prior to the rupturing.

7. The method of claim 5, wherein healing the damage comprises reaction of the contents of at least some of the ruptured capsules with contents of different ruptured capsules.

8. The method of claim 5, wherein healing comprises contacting the first hardenable resin with the first hardener or activator in the ruptured capsules.

9. The method of claim 1, further comprising:
   allowing damage to form in the hardened resin thereby rupturing one or more of the plurality of capsules, wherein release of contents of the ruptured capsules at least partially heals the damage;
   wherein the healing comprises contacting the second hardenable resin of some of the ruptured capsules with the first hardener or activator of some of the ruptured capsules.

10. The method of claim 1, further comprising:
    allowing damage to form in the hardened resin thereby rupturing one or more of the plurality of capsules, wherein release of contents of the ruptured capsules at least partially heals the damage,
    wherein the healing comprises contacting the solvent of some of the ruptured capsules with the hardened resin.

11. The method of claim 1, wherein the first hardener or first activator comprises at least one of an amine, a diamine, a polyamine, an alcohol, a diol, a polyol, a thiol, a dithiol, a polythiol, a dialdehyde, a polyaldehyde, a urea, a disulfide, an anhydride, a dianhydride, or an ethylenically unsaturated substituted or unsubstituted (C2-C50)hydrocarbon.

12. The method of claim 1, wherein the first hardenable resin comprises at least one of a thermoplastic polymer or monomer thereof, a shellac, a polyamide monomer, a silyl-modified polyamide monomer, a polyester monomer, a polycarbonate monomer, a polycarbamate monomer, a polyurethane monomer, a natural resin, an epoxy-based resin monomer, a furan-based resin monomer, a phenolic-based resin monomer, a urea-aldehyde resin monomer, a phenol-phenol formaldehyde-furfuryl alcohol resin monomer, a diisocyanate resin monomer, a vinyl monomer, a (C1-C10) alkyl acrylate ester monomer, a (C1-C10)alkyl (C1-C10) alkylacrylate ester monomer, an alkene-containing substituted or unsubstituted (C1-C50)hydrocarbon, a cyclic olefin, a vinyl alcohol, a divinyl-substituted (C1-C10)hydrocarbon, a disulfide-containing epoxy-resin monomer, a diaminopolyorganosiloxane, a diaminopolyalkyleneoxide, a polyorganosiloxane diol, or a polyalkyleneoxide diol.

13. The method of claim 1, wherein the capsules have a diameter of about 1 micron to about 1 mm, and wherein an outer wall of the capsules have a thickness of about 10 nm to about 100 microns.

14. The method of claim 1, wherein the composition further comprises a proppant, and wherein the placing of the composition in the subterranean formation comprises fracturing at least part of the subterranean formation to form at least one subterranean fracture.

15. A method of treating a subterranean formation, the method comprising:
    placing a tubular in the subterranean formation;
    pumping, via a pump, a composition in a subterranean formation through the tubular, the composition comprising:
       a plurality of capsules having a diameter of about 0.1 micron to about 10 mm wherein some of the capsules contain a first hardenable resin, other capsules contain a first hardener or activator, and other capsules contain a solvent; and
       a material outside the plurality of capsules comprising a second hardenable resin and at least one of a second hardener or a second activator; and
    forming a hardened resin in the subterranean formation from the second hardenable resin with the plurality of capsules still intact.

* * * * *